(12) United States Patent
Remaker (10) Patent No.: US 8,719,203 B2
(45) Date of Patent: May 6, 2014

(54) METHOD AND APPARATUS FOR TIME-BASED DECAY OF KNOWLEDGE BASE RATINGS

(75) Inventor: Phillip A. Remaker, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 280 days.

(21) Appl. No.: 13/399,996

(22) Filed: Feb. 17, 2012

(65) Prior Publication Data

US 2013/0218822 A1    Aug. 22, 2013

(51) Int. Cl.
*G06F 17/00* (2006.01)
*G06N 5/00* (2006.01)

(52) U.S. Cl.
USPC ............................................................ 706/45

(58) Field of Classification Search
USPC ............................................................ 706/45
See application file for complete search history.

(56) References Cited

U.S. PATENT DOCUMENTS

| | | | |
|---|---|---|---|
| 6,064,971 A | 5/2000 | Hartnett | |
| 6,892,178 B1 * | 5/2005 | Zacharia | 705/7.29 |
| 6,892,179 B1 * | 5/2005 | Zacharia | 705/4 |
| 6,895,385 B1 * | 5/2005 | Zacharia et al. | 705/7.29 |
| 7,509,230 B2 | 3/2009 | Fernandez et al. | |
| 7,644,423 B2 | 1/2010 | Ludvig et al. | |
| 7,945,656 B1 * | 5/2011 | Remaker | 709/224 |
| 7,966,319 B2 | 6/2011 | Faus et al. | |
| 8,116,442 B2 * | 2/2012 | Remaker | 379/202.01 |
| 2006/0015378 A1 | 1/2006 | Mirrashidi et al. | |
| 2006/0247980 A1 | 11/2006 | Mirrashidi et al. | |
| 2011/0022602 A1 | 1/2011 | Luo et al. | |

OTHER PUBLICATIONS http://blog.linkibol.com/2010/05/07/how-to-build-a-popularity-algorithm-you-can-be-proud-of/.

\* cited by examiner

*Primary Examiner* — Michael B Holmes
(74) *Attorney, Agent, or Firm* — P. Su (57) ABSTRACT

In one embodiment, a method includes obtaining a plurality of ratings associated with an element, where the plurality of ratings includes at least a first rating and a second rating. The method also includes applying a first weighting factor to the first rating and applying a second weighting factor to the second rating. The first weighting factor is different from the second weighting factor. Finally, the method includes determining a cumulative rating using the first weighting factor, the second weighting factor, and the plurality of ratings. The cumulative rating is associated with the element and the second weighting factor is arranged to discount the second rating.

19 Claims, 5 Drawing Sheets

METHOD AND APPARATUS FOR TIME-BASED DECAY OF KNOWLEDGE BASE RATINGS

TECHNICAL FIELD

The disclosure relates generally to network based services. More particularly, the disclosure relates to providing a bias for recent rankings of an element such that recent rankings are effectively prioritized over older rankings.

BACKGROUND

Many web sites, forums, and knowledge bases allow elements to be ranked or rated based on quality, content, and/or satisfaction. For example, a web site that sells goods may allow individual purchasers to rank the goods, and a web site that provides documents or articles may allow individual readers to rank the documents or articles. The rankings are often provided based on scales that are based on points, e.g., a scale that ranges between one point and five points may be such that a ranking of one point indicates a high level of dissatisfaction while a ranking of five points indicates a high level of satisfaction. Rankings provided by different individuals with respect to an element are typically averaged to provide an "overall ranking" for the element.

Rankings associated with a web site, forum, or knowledge base may change as time progresses. By way of example, as information on a web site may be time-sensitive, the information may become more inaccurate and/or less valuable over time. As a result, the rankings provided by users may trend lower as time progresses if the information on a web site becomes more inaccurate and/or less valuable over time. The overall ranking for information is determined by averaging the rankings provided by the users and, as a result, older rankings are considered with the same weight as newer rankings.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

According to one aspect, a method includes obtaining a plurality of ratings associated with an element, where the plurality of ratings includes at least a first rating and a second rating. The method also includes applying a first weighting factor to the first rating and applying a second weighting factor to the second rating. The first weighting factor is different from the second weighting factor. Finally, the method includes determining a cumulative rating using the first weighting factor, the second weighting factor, and the plurality of ratings. The cumulative rating is associated with the element and the second weighting factor is arranged to discount the second rating.

DESCRIPTION

Individual elements associated with web sites, forums, and/or knowledge bases may often be ranked or rated by individuals, e.g., users or community members. Many web sites allow elements to be ranked or rated using a scale such as a star scale in which a rating of one star may indicate low quality and a rating of five stars may indicate high quality. Upon obtaining ranks or ratings from multiple individuals relating to an element, an average rating is often determined. By way of example, a web site, forum, or knowledge base that provides articles may be such that an article is rated by an individual using a star scale. Often, ratings obtained from individuals are averaged to determine an average rating for an element. Every rating used to determine an average rating is generally weighted equally.

Accounting for temporal factors when determining an overall rating for an element allows the contribution of substantially outdated ratings to be minimized, while essentially maximizing the contribution of ratings that are more current. Thus, an overall cumulative rating may provide a timely, accurate view of the value of an element.

By discounting older ratings associated with an element and effectively biasing a cumulative rating, e.g., a current overall rating, towards newer ratings associated with the element, the cumulative rating may more accurately reflect the current rating of the element. That is, by weighting rankings or ratings provided more recently higher than rankings or ratings provided less recently when calculating a cumulative ranking or rating, the cumulative ranking or rating may provide a more accurate view of the value of a rated element.

In one embodiment, when ratings are obtained with respect to content contained in a document, by weighting newer ratings higher than older ratings when determining a cumulative rating, a more accurate reflection of the value of the document and/or the accuracy of the content of the document may captured by the cumulative rating. By way of example, if flaws in a document are corrected, the more recent ratings of the document may reflect the change while the older ratings of the document may reflect the flaws and, therefore, be out-of-date. Thus, by weighting the various rankings such that there is a bias towards the more recent ratings when a cumulative rating is calculated, the cumulative rating may more accurately reflect the value of the document in its current state. In other words, by allowing more recent ratings to more quickly overwhelm the older ratings, e.g., obtained when the document was flawed, a cumulative rating may provide a more accurate representation of the quality of the document in its current state.

A cumulative rating may generally be calculated using a formula or algorithm which provides more weight towards newer ratings than older ratings. In other words, a cumulative rating may be time-based in that more recent ratings are weighted higher than older ratings. A time-based cumulative rating may be calculated using any suitable formula which provides for a time-based decay. In one embodiment, a cumulative rating may be determined using an exponentially decayed rating calculation, e.g., an exponentially decayed weighted moving average calculation. It should be appreciated that an exponentially weighted moving average may be at least partially dependent upon elapsed time.

Figure 1A:
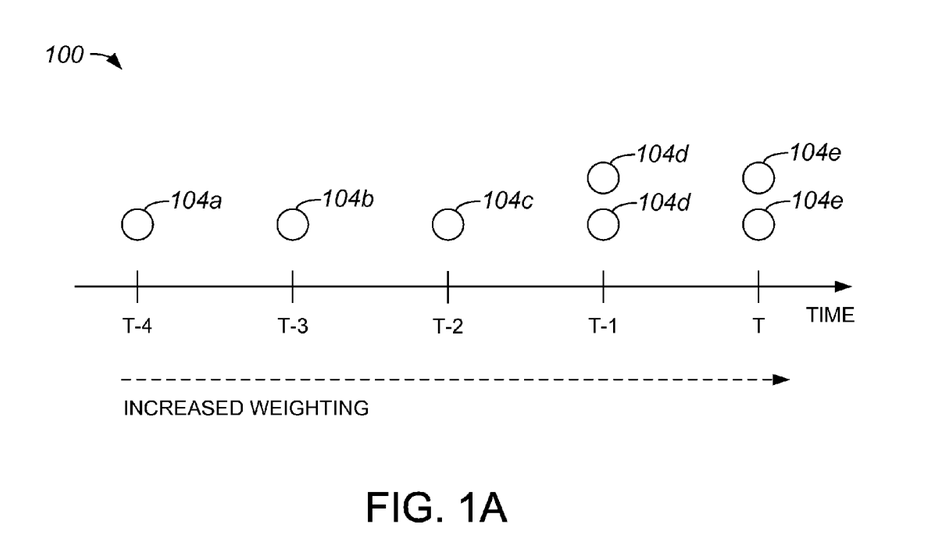
FIG. 1A is a diagrammatic representation of a timeline which illustrates a first weighting scale that is biased towards more recent ratings in accordance with an embodiment.
Figure 1B:
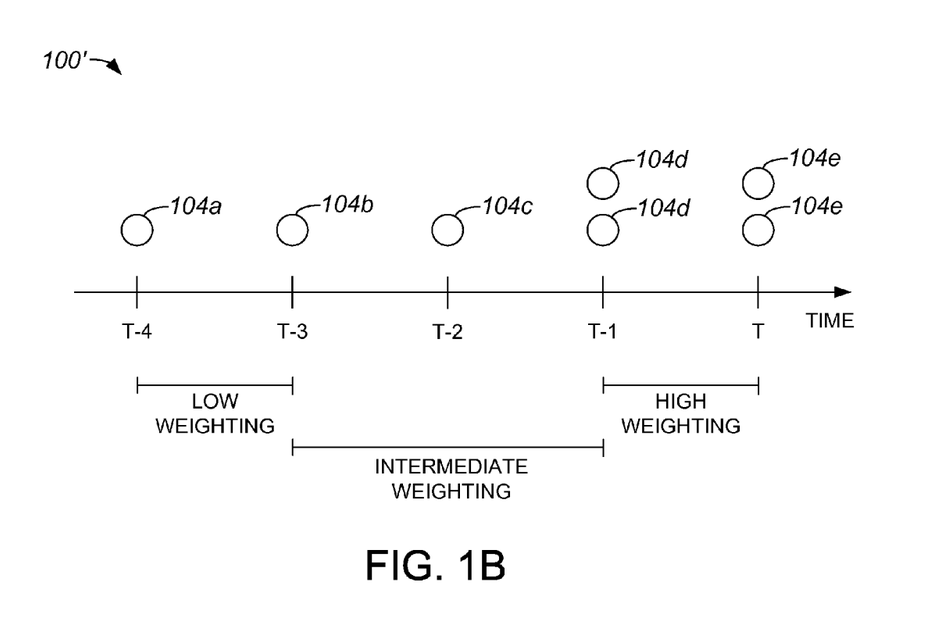
FIG. 1B is a diagrammatic representation of a timeline which illustrates a second weighting scale that is biased towards more recent ratings in accordance with an embodiment.

Referring initially to FIGS. 1A and 1B, temporal weighting scales will be described. FIG. 1A is a diagrammatic representation of a timeline which illustrates a first time-based weighting scale that is biased towards more recent ratings in accordance with an embodiment. A timeline 100 depicts ratings 104a-e that are obtained at different times. Ratings 104a-e may be obtained from users or individuals, and may relate to perceptions of an element, e.g., a document or an article. As shown, ratings 104e are obtained at a current time "T," while rating 104a is obtained at a previous time "T−4."

In one embodiment, the weight assigned to each rating 104a-e for use in determining a cumulative, e.g., current overall, rating is associated with the time at which each rating is obtained. Increased, or higher, weights are assigned to ratings 104e obtained at current time "T." The lowest weight may be assigned to rating 104a obtained at time "T−4," and the weights assigned to ratings 104a-e may increase such that each time is associated with a higher weight than a previous time. It should be appreciated that weights assigned to ratings 104a-e may increase linearly and/or non-linearly, e.g., exponentially. By way of example, weights assigned to ratings 104a-e may be assigned non-linearly such that ratings 104a-e may be used to calculate an exponentially weighted moving average. In general, the older the last rating of ratings 104a-e, the less weight that is assigned.

An exponentially weighted moving average may generally be calculated or determined using any suitable exponential decay function. For example, weighting factors applied to ratings such as ratings 104a-e of FIG. 1A, may be expressed such that a weighting factor (Weighting_Factor) for any given rating is an exponential function of a time since a last rating (time_since_last_rating) and a rating decay lifetime (rating_decay_lifetime). A rating decay lifetime effectively represents how fast ratings may to be reduced in value.

$$\text{Weighting\_Factor} = 1 - e^{-\frac{\text{time\_since\_last\_rating}}{\text{rating\_decay\_lifetime}}}$$

FIG. 1B is a diagrammatic representation of a timeline which illustrates a second time-based weighting scale that is biased towards more recent ratings in accordance with an embodiment. A timeline 100' depicts ratings 104a-e that are obtained at different times. As shown, ratings 104e are obtained at a current time "T," while rating 104a is obtained at a previous time "T−4."

Any number of different weightings may be applied to ratings 104a-e. Although three different weightings are shown in FIG. 1B, it should be understood that the number of weightings may vary widely. During a current time period starting at time "T−1" and ending time "T," a high weighting may be applied to ratings 104d, 104e that are obtained. During an older time period between starting time "T−4" and ending time "T−3," a low weighting may be applied to ratings 104a, 104b that are obtained. During an intermediate time period, e.g., the time period between time "T−3" and time "T−1," an intermediate weighting may be applied to rating 104c. Thus, the most recent ratings 104d, 104e may be weighted more highly than less recent ratings 104a-c.

In one embodiment, a low weighting applied during the time period between starting time "T−4" and ending time "T−3" may effectively be a zero weighting. That is, older ratings 104a, 104b may effectively be given no weight in the calculation of a cumulative rating.

Figure 2:
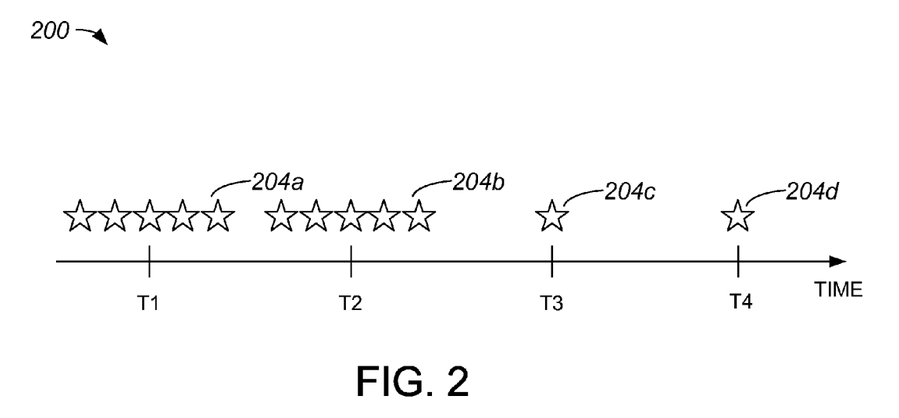
FIG. 2 is a diagrammatic representation of a timeline which illustrates individual star ratings provided at different times in accordance with an embodiment.

Elements may often be ranked or rated using stars. For example, a "five-star" rating may indicate a high quality or value, while a "one-star" rating may indicate a low quality or value. FIG. 2 is a diagrammatic representation of a timeline which illustrates individual star ratings provided at different times in accordance with an embodiment. A timeline 200 associated with a star rating system for an element indicates that a five-star rating 204a is obtained at a time "T1" and that a five-star rating 204b is obtained at a time "T2." One-star ratings 204c, 204d are obtained at a time "T3" and a time "T4," respectively. In one embodiment, ratings 204c, 204d are more recent than ratings 204a, 204b, and may be weighted such that ratings 204c, 204d effectively overwhelm ratings 204a, 204b when a current overall rating is determined, e.g., using a decayed ranking system.

Figure 3:
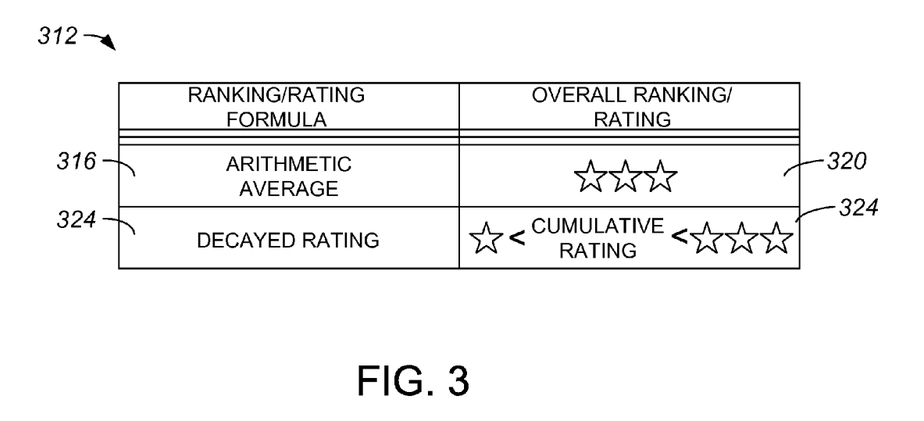
FIG. 3 is a diagrammatic representation of a table which indicates overall ratings obtained using different formulas in accordance with an embodiment.

Using ratings 204a-d and information relating to the times at which ratings 204a-d were obtained, an overall rating may be determined. An overall rating may be a cumulative rating in which ratings used to calculate the cumulative rating are weighted, e.g., using time-based weightings. With reference to FIG. 3, overall ratings will be described in accordance with an embodiment. FIG. 3 is a diagrammatic representation of a table which indicates overall ratings obtained using different formulas in accordance with an embodiment. A table 312 shows different overall ratings that may be associated with the ratings associated with timeline 200 of FIG. 2. If a rating formula applied to ratings 204a-d as shown in FIG. 2 is an arithmetic average, then an overall rating 320 is an average ranking of three stars. As will be appreciated by those skilled in the art, arithmetic average 316 is determined by adding ratings 204a-d and dividing by a total number of ratings.

If a rating formula applied to ratings 204a-d of FIG. 2 is a decayed rating formula, then an overall rating 324 is a cumulative rating. Cumulative rating 324 may be between approximately a one-star rating and a three-star rating, depending upon the actual decayed rating formula applied Cumulative rating 324 is generally determined by decaying older ratings, e.g., rating 204a and rating 204b, such that newer, more current ratings, e.g., rating 204c and rating 204d, are given more weight. Thus, cumulative rating 324 is temporal, and takes the time at which each rating 204a-d was entered or otherwise made, as for example by an individual, into account when determining how much weight to give each rating 204a-d.

Figure 4:
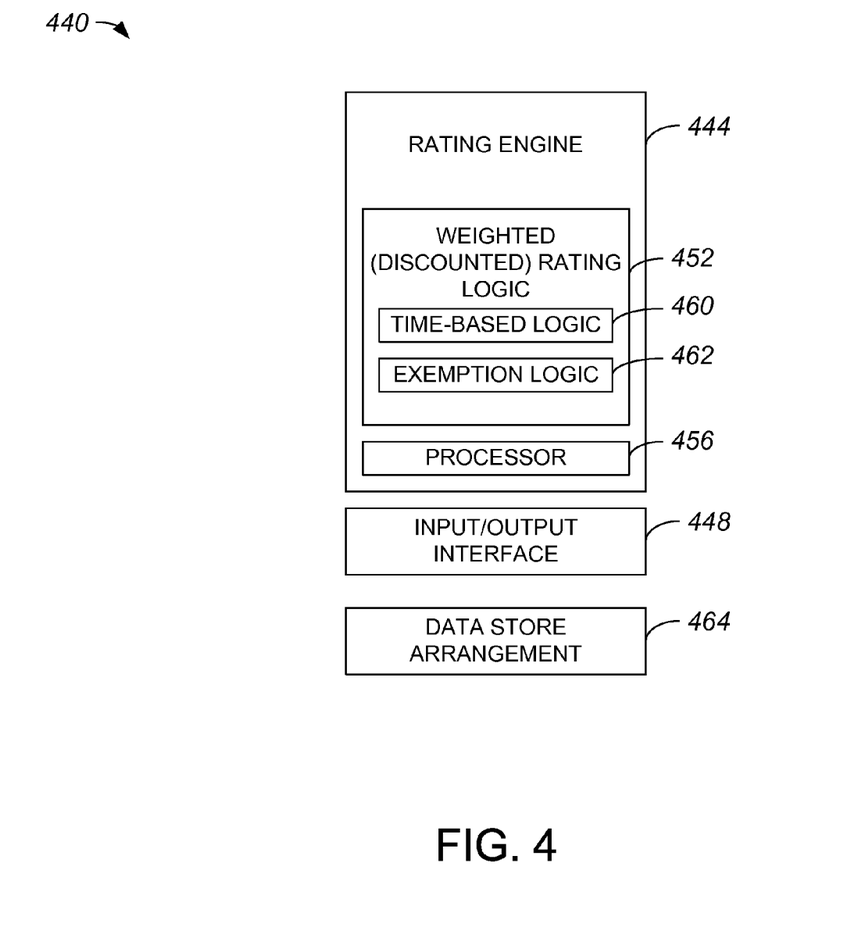
FIG. 4 is a block diagram representation of a system that is configured to calculate an overall rating using a time-based weighting logic in accordance with an embodiment.

FIG. 4 is a block diagram representation of a system that is configured to calculate an overall rating using a time-based weighting logic in accordance with an embodiment. A system 440, which may be a computing system, includes a rating engine 444, an input/output interface 448, and a data store arrangement 464. Rating engine 444 generally includes weighted rating logic 452 and a processor 456 configured to execute weighted rating logic 452. Weighted rating logic 452 is generally arranged to provide weights, e.g., discount or decay factors, and to calculate a cumulative rating using ratings obtained from individuals and the weights. In one embodiment, weighted rating logic 452 includes time-based or temporal logic 460 which allows information regarding when ratings were obtained to be accounted for in a determination of a cumulative rating. That is, time-based logic 460 implements a time-based weighting in a cumulative rating determination. For example, time-based logic 460 supports a determination of a cumulative rating using a time-based exponential decay formula.

Some ratings may effectively be exempt from being decayed or discounted by weighted rating logic 452. By way of example, ratings obtained from a certain class of individuals may not be subject to time-based weighting. Optional exemption logic 462 may generally enable certain ratings to be identified as being substantially exempt from being discounted or decayed and, hence, effectively exempt from time-based weighting.

Input/output interface 448 is arranged to obtain ratings or ranks, e.g., from individuals. Additionally, input/output interface 448 is arranged to output a cumulative rating determined by rating engine 444. A data store arrangement 464 may be a database configured to store individual ratings and/or a cumulative rating. For example, data store arrangement 464 may store ratings obtained through input/output interface 448 from individuals, and may provide the stored ratings to rating engine 444.

Figure 5:
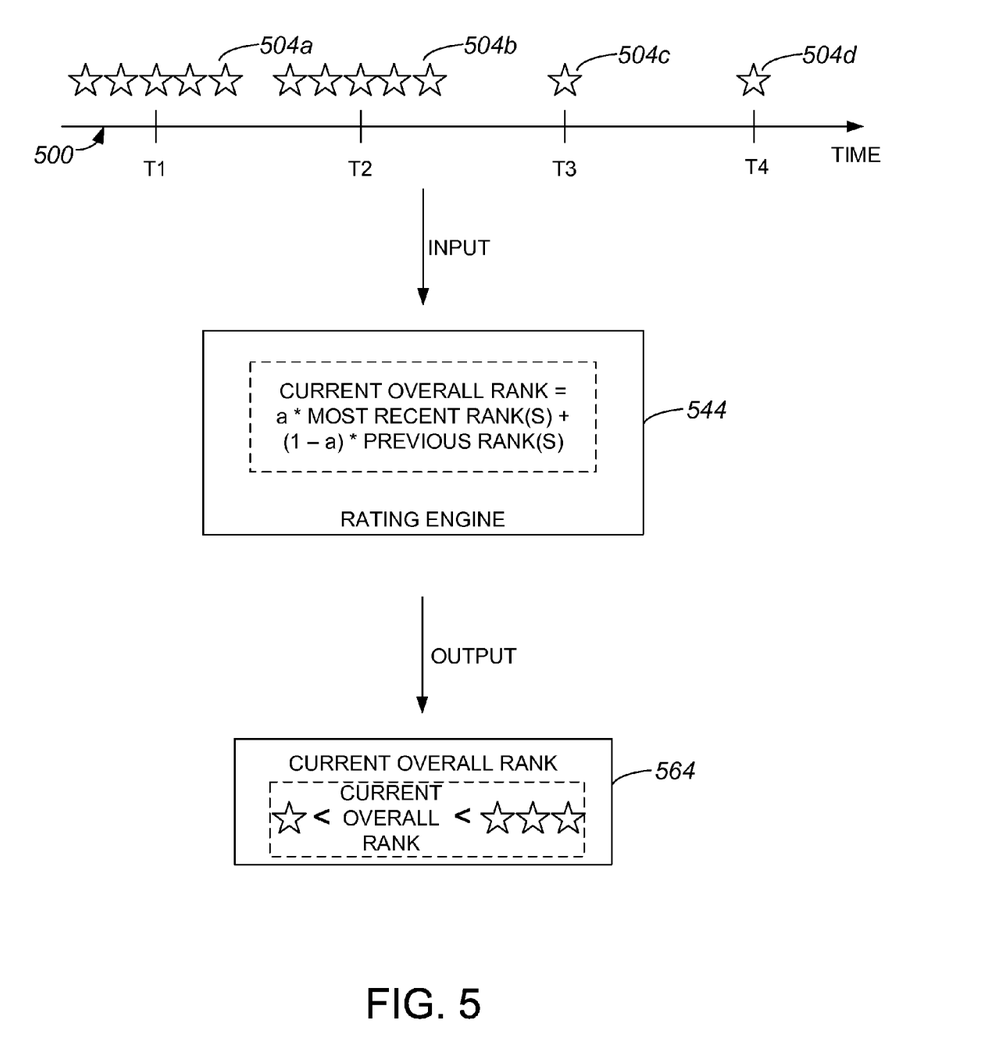
FIG. 5 is a diagrammatic representation of a process of determining an overall rating using a time-based rating algorithm in accordance with an embodiment.

Referring next to FIG. 5, a process of determining an overall rating using a time-based rating algorithm will be described in accordance with an embodiment. Ratings or ranks 504a-d associated with a timeline 500, i.e., ranks 504a-d provided at different times, are obtained by a rating engine 544. Rating engine 544 is arranged to apply a time-based rating algorithm to ranks 504a-d such that a current overall rank 564, or a cumulative rating, may be determined. As shown, ranks 504a, 504b are five-star ranks, while ranks 504c, 504d are one-star ranks.

The time-based rating algorithm applied by rating engine 544 may generally be any temporal algorithm that is configured to allow newer ranks 504a-d to effectively overwhelm older ranks 504a-d when current overall rank 564 is determined. As previously mentioned, a time-based rating algorithm may be associated with an exponential decay over time.

In one embodiment, current overall rank 564 may be expressed as follows:

$$\text{Current Overall Rank} = a*(\text{Most Recent Rank}(s)) + (1-a)*(\text{Previous Rank}(s))$$

Value "a" may generally be a number in a range between zero and one. Typically, a larger choice of value "a" is arranged to discount previous ratings more quickly. Value "1–a" is a discount factor that effectively discounts previous ratings. It should be appreciated that other temporal algorithms may be applied by rating engine 544 to ranks 504a-d. For example, a temporal algorithm that exponentially decays ranks 504a-d such as an exponential moving average may be implemented by rating engine 544.

It should be appreciated that when a simple arithmetic average of ranks 504a-d is calculated, a simple average rank may be a three-star rank. However, when current overall rank 564 is calculated using rating engine 544 such that the time at which each rank 504a-d is obtained is accounted for, current overall rank 564 may have a value between a one-star rank and a three-star rank. The time at which each rank 504a-d is obtained is accounted for by rating engine 544, and more recent ranks 504a-d are weighed more heavily than older ranks 504a-d in a calculation of current overall rank 564. As more recent ranks 504a-d are associated with lower ranks while older ranks 504a-d are associated with higher ranks, current overall rank 564 is lower than a simple average rank.

Figure 6:
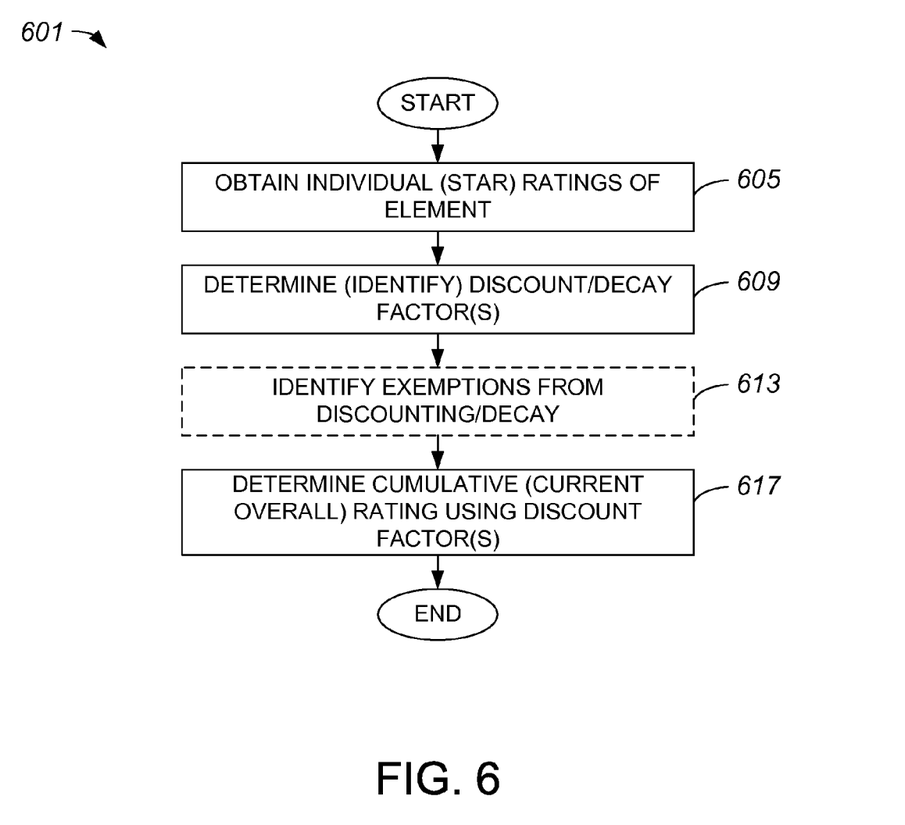
FIG. 6 is a process flow diagram which illustrates an overall method of processing ratings to determine a cumulative rating, e.g., a current overall rating, in accordance with an embodiment.

FIG. 6 is a process flow diagram which illustrates an overall method of processing individual ratings to determine a current overall rating in accordance with an embodiment. A method 601 of processing individual ratings begins at step 605 in which ratings for an element are obtained. The ratings are generally ratings provided by individual users, e.g., community members or consumers of the element. Such ratings may be obtained from a database, or substantially directly from individual users. In one embodiment, the ratings are star ratings which may range from approximately zero stars to approximately five stars. The element for which individual ratings are obtained may be, but is not limited to being, an object, a document, an article, a person, or a place. By way of example, an individual may rate his or her satisfaction with a particular object, or an individual may rate the quality of a document or an article.

Once individual ratings of an element are obtained, at least one discount or decay factor may be determined in step 609. It should be appreciated that the number of discount or decay factors used to determine a cumulative rating may vary widely. In one embodiment, as discussed above with respect to FIG. 5, a factor "a" may be identified, and "a" may be a multiplier used for more recent ratings, while discount factor of "1–a" may be a multiplier used for older ratings. Alternatively, multiple different discount factors may be identified for use such that different multipliers are applied to different ratings based on when each rating was made. By way of example, a first discount factor may be associated with ratings obtained during a first time period, a second discount factor may be associated with ratings obtained during a second time period, and a third discount factor may be associated with ratings obtained during a third time period.

After discount factors are determined, process flow proceeds to an optional step 613 in which exemptions from discounting are identified. That is, ratings which are not to be discounted, or are not to be processed as older ratings regardless of when the ratings were obtained, in a determination of a cumulative rating are identified. Ratings which are substantially exempt from discounting may include, but are not limited to including, ratings provided by certain individuals or by a certain class of individuals. By way of example, if a particular user is identified as trustworthy or as a "power user," any rating provided by the user may be substantially exempt from being discounted regardless of when the rating was provided. A rating that is exempt from discounting is not subject to time decay, and may effectively be weighted in a calculation of a cumulative rating as a recent rating.

In step 615, a cumulative rating for the element is determined using discount factors while accounting for exemptions, when applicable. As discussed above, a cumulative rating, or a current overall rating, may be calculated using a weighted rating formula, e.g., an exponentially decayed weighting formula such as an exponentially time decayed weighting formula. After a cumulative rating is determined, the method of processing individual ratings is completed.

Although only a few embodiments have been described in this disclosure, it should be understood that the disclosure may be embodied in many other specific forms without departing from the spirit or the scope of the present disclosure. By way of example, while ratings have generally been described as including star ratings, it should be appreciated that ratings are not limited to being star ratings. Ratings may be substantially quantified using any suitable scale. For instance, ratings may be associated with a numerical scale, or ratings may be associated with a scale which includes rating levels ranging from "poor" to "excellent."

As described above, some ratings may effectively be exempted from discounting or time decay. Ratings provided by a certain class of users or individuals may be substantially exempted from discounting. That is, multiple classes may be substantially exempt from a temporal component and not subject to time decay. In one embodiment, multiple classes of users may be substantially exempted from time-based discounting, with each of the multiple classes being subject to different weighting factors.

A cumulative rating has generally been described as a current overall rating for an element such as an object, a document, an article, a person, or a place. It should be appreciated that cumulative ratings may be calculated or otherwise determined for any suitable element, and are not limited to being determined for objects, documents, articles, people, or places.

A cumulative rating may be such that the contribution of various individual ratings decays over time, i.e., with the age of the individual ratings. In one embodiment, a maximum lifetime for each individual rating may be set such that individual ratings which have exceeded the maximum lifetime may effectively be disregarded in determining a cumulative rating.

In one embodiment, time-based weighting factors may be calculated based on an exponential decay. It should be appreciated that time-based weighting factors may generally vary widely, and may be determined using any suitable method. For example, in another embodiment, time-based weighting factors may effectively be pre-calculated and stored in a table that is accessed by a rating algorithm.

The embodiments may be implemented as hardware and/or software logic embodied in a tangible medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
    obtaining a plurality of ratings, the plurality of ratings being associated with an element, wherein the plurality of ratings includes at least a first rating and a second rating;
    applying a first weighting factor to the first rating;
    applying a second weighting factor to the second rating, the first weighting factor being different from the second weighting factor;
    determining a cumulative rating using the first weighting factor, the second weighting factor, and the plurality of ratings, wherein the cumulative rating is associated with the element and the second weighting factor is arranged to discount the second rating.

2. The method of claim 1 wherein the cumulative rating is a time-based rating.

3. The method of claim 2 wherein the first rating is obtained at a first time and the second rating is obtained at a second time, the first time being after the second time, and wherein the second weighting factor is arranged to discount the second rating more than the first weighting factor is arranged to discount the first rating.

4. The method of claim 1 wherein determining the cumulative rating includes using the first weighting factor and the second weighting factor to bias newer ratings of the plurality of ratings over older ratings of the plurality of ratings, the first rating being newer than the second rating.

5. The method of claim 1 wherein the element is a document, and wherein the cumulative rating is associated with content of the document.

6. The method of claim 1 wherein determining the cumulative rating includes calculating an exponentially weighted average using the plurality of ratings, the first weighting factor, and the second weighting factor.

7. The method of claim 6 wherein determining the cumulative weighting further includes identifying a third rating of the plurality of ratings, and wherein the exponentially weighted average is an exponentially weighted moving average that is determined using the first rating and the second rating but not the third rating.

8. The method of claim 1 wherein the plurality of ratings includes a third rating, the method further including:
    determining whether to apply the second weighting factor to the third rating;
    applying the second weighting factor to the third rating when it is determined that the second weighting factor is to be applied to the third rating; and
    applying the first weighting factor to the third rating when it is determined that the third weighting factor is not to be applied to the third rating.

9. The method of claim 8 wherein when it is determined that the second weighting factor is not to be applied to the third rating, the third rating is exempt from being discounted in the cumulative rating.

10. An apparatus comprising:
    means for obtaining a plurality of ratings, the plurality of ratings being associated with an element, wherein the plurality of ratings includes at least a first rating and a second rating;
    means for applying a first weighting factor to the first rating;
    means for applying a second weighting factor to the second rating the first weighting factor being different from the second weighting factor;
    means for determining a cumulative rating using the first weighting factor, the second weighting factor, and the plurality of ratings, wherein the cumulative rating is associated with the element and the second weighting factor is arranged to discount the second rating.

11. A tangible, non-transitory computer-readable medium comprising computer program code, the computer program code, when executed, configured to:

obtain a plurality of ratings, the plurality of ratings being associated with an element, wherein the plurality of ratings includes at least a first rating and a second rating;

apply a first weighting factor to the first rating;

apply a second weighting factor to the second rating the first weighting factor being different from the second weighting factor;

determine a cumulative rating using the first weighting factor, the second weighting factor, and the plurality of ratings, wherein the cumulative rating is associated with the element and the second weighting factor is arranged to discount the second rating.

12. The tangible, non-transitory computer-readable medium of claim 11 wherein the cumulative rating is a time-based rating.

13. The tangible, non-transitory computer-readable medium of claim 12 wherein the first rating is obtained at a first time and the second rating is obtained at a second time, the first time being after the second time, and wherein the second weighting factor is arranged to discount the second rating more than the first weighting factor is arranged to discount the first rating.

14. The tangible, non-transitory computer-readable medium of claim 11 wherein the computer program code configured to determine the cumulative rating is further configured to use the first weighting factor and the second weighting factor to bias newer ratings of the plurality of ratings over older ratings of the plurality of ratings, the first rating being newer than the second rating.

15. The tangible, non-transitory computer-readable medium of claim 11 wherein the element is a document, and wherein the cumulative rating is associated with content of the document.

16. The tangible, non-transitory computer-readable medium of claim 11 wherein the computer program code configured to determine the cumulative rating is further configured to calculate an exponentially weighted average using the plurality of ratings, the first weighting factor, and the second weighting factor.

17. The tangible, non-transitory computer-readable medium of claim 16 wherein the computer program code configured to determine the cumulative weighting is further configured to identify a third rating of the plurality of ratings, and wherein the exponentially weighted average is an exponentially weighted moving average that is determined using the first rating and the second rating but not the third rating.

18. The tangible, non-transitory computer-readable medium of claim 11 wherein the computer program code is further configured to:

determine whether to apply the second weighting factor to the third rating;

apply the second weighting factor to the third rating when it is determined that the second weighting factor is to be applied to the third rating; and apply the first weighting factor to the third rating when it is determined that the third weighting factor is not to be applied to the third rating.

19. The tangible, non-transitory computer-readable medium of claim 18 wherein when it is determined that the second weighting factor is not to be applied to the third rating, the third rating is exempt from being discounted in the cumulative rating.

* * * * *